Patented June 29, 1926.

UNITED STATES PATENT OFFICE.

HUGO LIEBERS, OF FULNEK, CZECHOSLOVAKIA, ASSIGNOR TO HAMBURGER & CO. GESELLSCHAFT MIT BESCHRÄNKTER HAFTUNG, OF FULNEK, CZECHOSLOVAKIA, A CZECHOSLOVAKIAN COMPANY.

PROCESS FOR PREPARATION OF CHEESE HAVING AN INCREASED OR SUPPLEMENTED VITAMINE CONTENT.

No Drawing. Application filed April 9, 1924, Serial No. 705,332, and in Germany December 21, 1923.

The present invention relates to a process for the preparation of cheese having an increased vitamine content. As additions containing vitamines, according to the invention, yeast is intended to be used.

It has already been proposed to prepare cheese from milk and yeast, by curdling milk to which liquid or liquefied yeast has been admixed. The mixture is then submitted in the usual manner to the cheese ripening process. Moreover, yeast, after having been submitted to a suitable preliminary treatment has been added to coagulated cheese curd. This known proposal however relates to the incorporation of only very small amounts of yeast, 20–40 grammes of a yeast treated with salt and mortified being added to 100 litres of milk, so that about 25 kilogrammes of the finished cheese contained at the utmost only 40 grammes of yeast. The sole purpose of the addition of such a small amount of yeast was to cause the ripening of the cheese to be effected in a certain direction, for the purpose of preparing a cheese with a definite type of taste (Chester cheese). Apart from the entirely small amounts, active vitamines were not incorporated with the cheese by the yeast, inasmuch as the latter was boiled for an hour.

Attempts to admix larger amounts of yeast to the milk prior to curdling or to the curd itself, have led to no result. The proteolytic ferments of the yeast also act upon the albumins of the milk, so that the cheese is liquefied (is caused to run) prior to ripening, even if the yeast is previously heated to 60–80° C., this disadvantage cannot be effectively overcome.

Now I have found that the increase of the vitamine contents in cheese by the addition of yeast, to cheese can be effected when incorporating the yeast only with the finished cheese while the same is in an incomplete but advanced state of maturation. If cheese in a semi-ripe or ripe condition, is kneaded with pressed yeast fresh or liquefied in any suitable manner without subjecting the yeast to any preliminary treatment, a product of the very limited stability of the known whey-cheese is obtained which nevertheless is no less suitable to be put into the market than the above mentioned comparatively perishable kinds of cheese. For the purpose of preparing a non-perishable product the yeast or a product of liquefaction of yeast must be Pasteurized at 60° C. in order to weaken the proteolytic ferments sufficiently. Moreover to attain complete imperishableness also the ripe or semi-ripe cheese must be Pasteurized for the purpose of rendering the bacteria ineffective prior to the incorporation of the yeast. In the practical manufacture, preferably both results are attained simultaneously by kneading pressed yeast or its liquefaction product with the ripe or semi-ripe cheese under heat, so that the cheese is simultaneously Pasteurized and the proteolytic enzymes of the yeast are practically destroyed. This method of carrying out the invention produces, under suitable conditions, especially the so-called rindless tongue-soluble cheese of Emmenthal (box gruyère) having a yeast content of 33% or more. In order to be completely imperishable the cheese must be drawn off under sterile conditions, and must be packed in a warm state. Inasmuch as in the production of these special kinds of cheese, liquefied yeast takes the place of water, which is usually incorporated with the cheese for the purpose of rendering it tongue-soluble, also the nutritive value of the cheese is increased by these means. Apart from the increase of the vitamine-contents or the addition thereof, the process has generally the advantage of cheapening the manufacture. Finally, it is also to be expected that such kinds of cheese containing yeast exhibit all those therapeutic qualities, which are attributed to yeast or dried yeast and to a comparatively increased degree. As an ordinary article of food this permanent cheese is used as supplementing food in all such cases where food poor in vitamines e. g. preserved food only is exclusively or almost exclusively available.

*Example.*

Semi-ripe cheese of Emmenthal is treated at 70–80° C. in a pug mill until it has acquired a doughy consistency. It is thereupon cooled to 60–70° C. and mixed with 20–50% of yeast calculated on its weight. For this purpose fresh pressed yeast as such may be used or a liquefied product obtained by autolysis or by treatment with hyperosmotic solutions or by bursting the cell walls by means of heat or cold, or by mechanical rupture. By maintaining the temperature between 60–70° C. until a completely homogeneous mixture has been obtained, the proteolytic ferments of the yeast or of the juice of the yeast cells are rendered ineffective. A detrimental influence upon the enzymes or other ferments hardly takes place, because this intimate mixing is effected very quickly and thus the heating lasts for only a very short period. The mixture is drawn off under sterile conditions and packed while warm.

I use the term "finished cheese" to include ripe and semi-ripe cheese and the term "yeast" to include not only fresh pressed yeast, but also a liquefied product obtained from yeast by autolysis, or by treatment with hyperosmotic solutions, or by bursting the cell walls by means of heat or cold, or by mechanical rupture.

I claim:—

1. The process for the preparation of cheese which consists in incorporating with the finished cheese while the same is in an incomplete but advanced state of maturation yeast and so treating the composition as to render ineffective the proteolytic enzymes contained therein.

2. The process for the preparation of cheese, which consists in kneading yeast with cheese under the influence of heat while the same is in an incomplete but advanced state of maturation.

3. The process for the preparation of cheese, which consists in kneading yeast with cheese while the same is in an incomplete but advanced state of maturation under the influence of heat, and maintaining the temperature at 60° to 70° centigrade until the cheese is Pasteurized and the proteolytic enzymes of the yeast are practically destroyed, then drawing off the cheese under sterile conditions and packing same in a warm state.

4. The process for the preparation of cheese which comprises kneading yeast with semi-ripe cheese of Emmenthal whilst maintaining a temperature of 60° to 70° centigrade until a homogeneous mixture has been obtained, then drawing off the mixture under sterile conditions and packing same in a warm state.

5. The process for the preparation of cheese which comprises heating semi-ripe cheese of Emmenthal until a doughy consistency is attained, thereupon cooling same to a temperature of 60° to 70° centigrade and intimately kneading the cheese with 20 to 50% of fresh pressed yeast, calculated on the weight of the cheese, whilst maintaining said latter temperature until a homogeneous mixture has been obtained, then drawing off the mixture under sterile conditions and finally packing same while warm.

6. Cheese, containing yeast, which had been rendered imperishable by partaking of the last phase of maturation of the cheese.

7. Pasteurized cheese having incorporated therewith yeast up to an amount of 50% calculated on its weight, the compound being of a stable imperishable character substantially free from active bacteria and proteolytic enzymes.

In testimony whereof I have affixed my signature.

HUGO LIEBERS.